(12) United States Patent
Valdez et al.

(10) Patent No.: US 12,712,635 B2
(45) Date of Patent: Aug. 18, 2026

(54) MULTI-BAND COEXISTENCE ELEMENT

(71) Applicant: FRONTIER COMMUNICATIONS HOLDINGS, LLC, Dallas, TX (US)

(72) Inventors: John Valdez, Copper Canyon, TX (US); Erwin Wardojo, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 476 days.

(21) Appl. No.: 18/237,442

(22) Filed: Aug. 24, 2023

(65) Prior Publication Data

US 2025/0070879 A1 Feb. 27, 2025

(51) Int. Cl.
*H04B 10/294* (2013.01)
*H04J 14/02* (2006.01)

(52) U.S. Cl.
CPC ........ *H04B 10/294* (2013.01); *H04J 14/0221* (2013.01)

(58) Field of Classification Search
CPC H04B 10/294; H04B 10/071; H04B 14/0221; H04B 14/0246; H04B 14/0282
See application file for complete search history.

(56) References Cited

PUBLICATIONS

C. Bhar, A. Kanungoe and G. Das, "Protection architecture for Passive Optical Networks using cascaded AWG and tunable components," 2015 IEEE International Broadband and Photonics Conference (IBP), Bali, Indonesia, 2015, pp. 7-14 (Year: 2015).*

* cited by examiner

*Primary Examiner* — Matthew Mikels

(57) ABSTRACT

A coexistence element within a passive optical network (PON) includes a housing having a plurality of input communication ports. Each input communication port is configured to receive, via a separate optical fiber, optical communications each having a wavelength within a particular wavelength band corresponding to a particular optical service. At least one of the input communication ports is configured to receive optical communications having wavelengths within two or more different wavelength bands. The housing also includes an output communication port configured to transmit, via a single optical fiber, the optical communications from each of the plurality of input communication ports.

25 Claims, 4 Drawing Sheets

| Channel Plan | Upstream | Downstream | Planned Utilization |
| --- | --- | --- | --- |
| λ0 | 1260-1280 | 1575-1581 | XGS PON |
| λ1 | 1290-1310 | 1340-1344 | 50G PON |
| λ23 | 1284-1288 | 1318-1322, 1356-1361 | VHS/25G PON |
| λ4 | 1530-1565 | 1596-1603 | Upgrade PON |
| MON | 600-700 | 1615-1660 | OTDR |

MULTI-BAND COEXISTENCE ELEMENT

FIELD OF THE DISCLOSURE

This disclosure relates generally to networking systems, and, more particularly, to a coexistence element within a passive optical network (PON) for combining different optical services on a single optical fiber.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

Today, coexistence elements are designed to combine PON services to conserve fiber utilization between the OLT and FDH. Coexistence elements also provide access to multiple PON types at the LMTU.

SUMMARY

The systems, methods, devices, and techniques described within this disclosure are directed to a coexistence element of a PON that receives incoming optical communications (e.g., using different optical services) from incoming optical fibers of the PON. The incoming optical communications have wavelengths within different wavelength bands. The coexistence element combines the optical communications and transmits each of the optical communications in a combined optical communication over a single optical fiber.

In some scenarios, an optical service such as Nokia's® 25G PON licenses a particular wavelength band. When legacy services such as XGS migrate to 25G they may be unable to use the wavelength band licensed by Nokia®. Accordingly, a legacy service may continue using the same wavelength band currently in use for the legacy service when it migrates to a higher data rate. To address this issue, the coexistence element may include a port (e.g., an input communication port) that receives optical communications for multiple wavelength bands. For example, the port may receive optical communications having wavelengths within the wavelength band licensed by Nokia® and optical communications having wavelengths within another wavelength band.

In an embodiment, a coexistence element within a passive optical network (PON) includes a housing including a plurality of input communication ports each configured to receive, via a separate optical fiber, optical communications each having a wavelength within a particular wavelength band corresponding to a particular optical service. At least one of the plurality of input communication ports is configured to receive optical communications having wavelengths within two or more different wavelength bands. The housing also includes an output communication port configured to transmit, via a single optical fiber, the optical communications from each of the plurality of input communication ports.

In another embodiment, a method for wavelength division multiplexing includes receiving, at each of a plurality of input communication ports within a coexistence element in a passive optical network (PON) via a separate optical fiber, optical communications each having a wavelength within a particular wavelength band corresponding to a particular optical service. At least one of the plurality of input communication ports receives optical communications having wavelengths within two or more different wavelength bands. The method also includes combining, by the coexistence element, the plurality of optical communications. Furthermore, the method includes transmitting, by an output communication port within the coexistence element, the combined optical communication via a single optical fiber.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1:
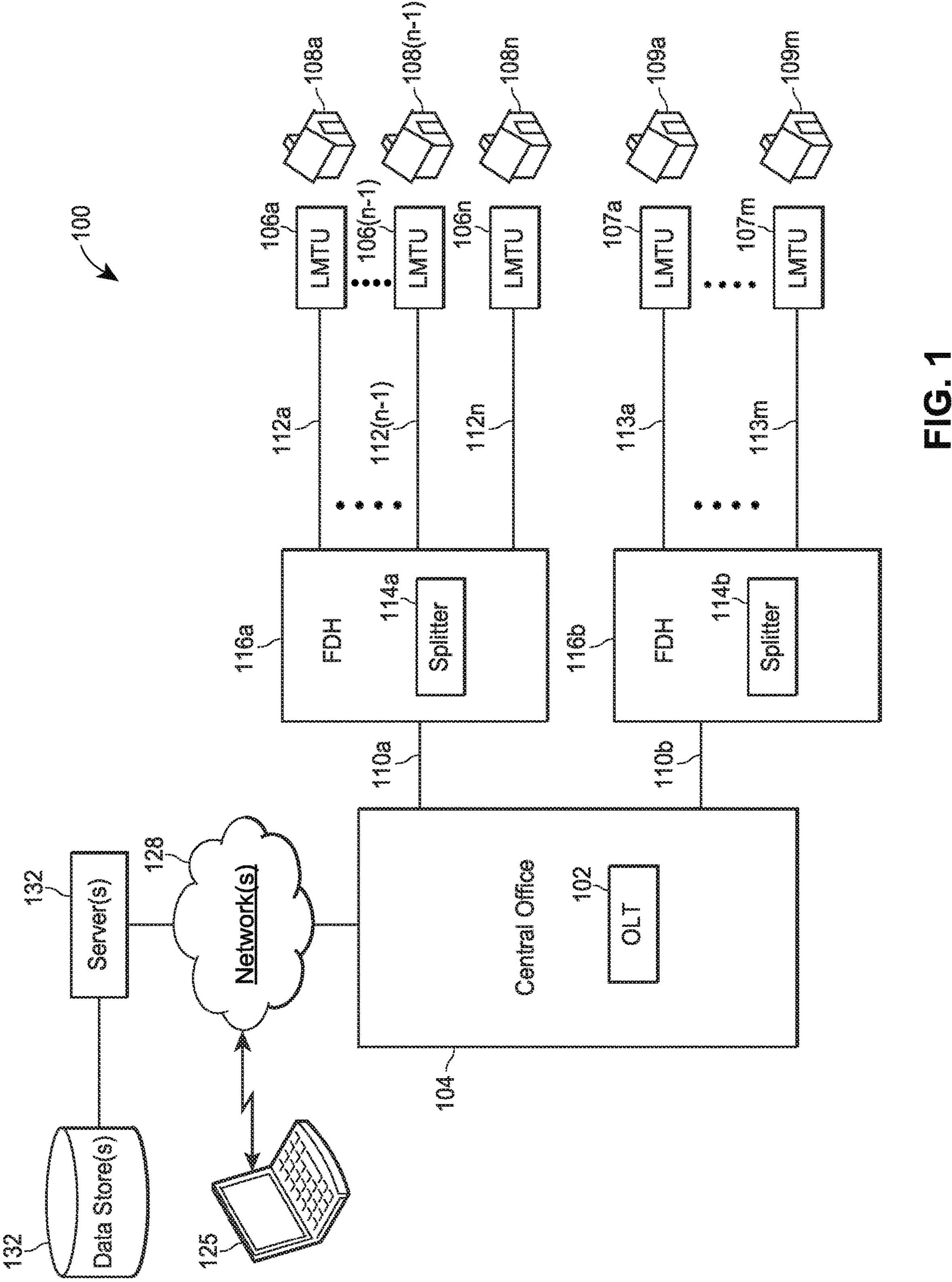
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units (LMTUs) 106*a*, . . . , 106*n* at respective customer premises 108*a*, . . . , 108*n*. The last mile termination units 106*a*, . . . , 106*n* may be located outside and/or inside the customer premises or locations 108*a*, . . . , 108*n*. Each last mile termination unit 106*a*, . . . , 106*n* may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110*a* from the OLT 102 (which is interchangeably referred to herein as an "F1 optical fiber 110*a*" or a "primary optical fiber 110*a*") serves the one or more last mile termination units 106*a*, . . . , 106*n* via respective distribution optical fibers 112*a*, . . . , 112*n* (which are interchangeably referred to herein as "F2 optical fibers 112*a*, . . . , 112*n*" or "secondary optical fibers 112*a*, . . . , 112*n*"). In the illustrated example, the first feeder optical fiber 110*a* is optically coupled to the plurality of last mile termination units 106*a*, . . . , 106*n* via an example one-to-many optical splitter 114*a* which is disposed, located, implemented, etc. in an example fiber distribution hub (FDH) 116*a*. In some arrangements, the FDH 116*a* is located within a geographic area (e.g., a neighborhood) such that the customer premises 108*a*, . . . , 108*n* are proximally close to the FDH 116*a*, and typically each of the customer premises 108*a*, . . . , 108*n* and respective last mile termination units 106*a*, . . . , 106*n* is disposed at a different optical distance from the FDH 116*a*. An "optical distance," as generally utilized herein, refers to a distance over which an optical signal travels or is delivered.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110*b* from the OLT 102 that is optically coupled to another plurality of last mile termination units 107*a*-107*m* at respective customer premises 109*a*-109*m* via another many-to-one optical splitter 114*b* included in another fiber distribution hub 116*b* and via respective secondary optical fibers 113*a*-113*m*.

As utilized herein, the "components" of the PON 100 generally refer to the devices, nodes, and optical fibers of the PON 100. For example, the components of the PON 100 shown in FIG. 1 may include the OLT 102, the FDHs 116*a*, 116*b*, the splitters 114*a*, 114*b*, the LMTs 106*a*-106*n* and 107*a*-107*m*, and the optical fibers interconnecting the devices or nodes, e.g., the optical fibers 110*a*-110*b*, 112*a*-112*n*, and 113*a*-113*m*.

In some scenarios, an optical terminal (e.g., the OLT 102 and/or one or more the last mile termination units 106*a*-106*n*, 107*a*-107*m*) may transmit optical test signals and/or patterns, indication light, and/or other types of measurement signals into an optical fiber in response to control signals received from a computing device. For example, the OLT 102 and/or the one or more LMTUs 106*a*-106*n*, 107*a*-107*m* may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

Example Coexistence Element

Figure 2:
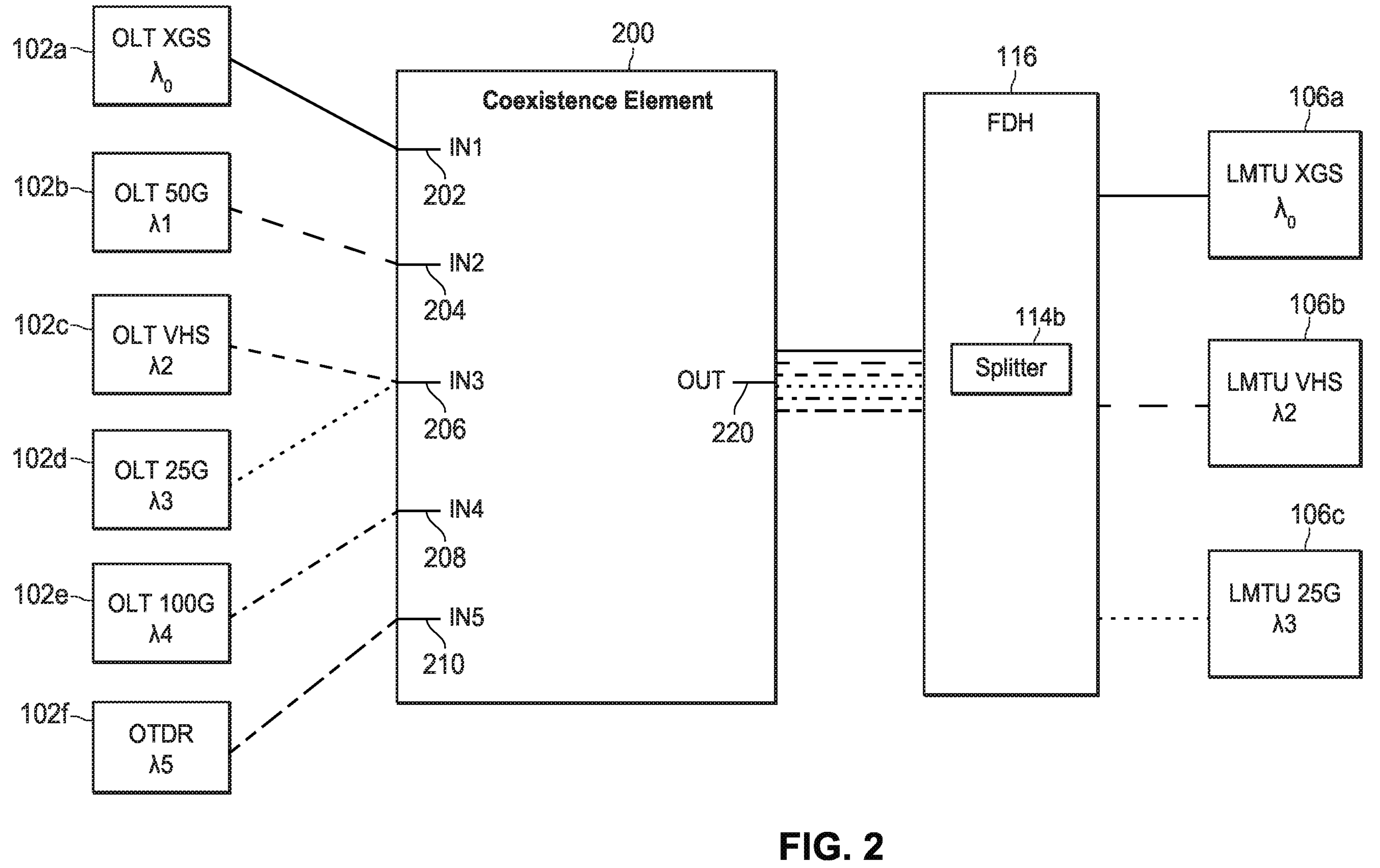
FIG. 2 is a block diagram of an example coexistence element that is in accordance with the techniques discussed herein and that may be included in the PON of FIG. 1.

FIG. 2 is a block diagram representative of an example coexistence element 200 which may be utilized in a passive optical network. For ease of illustration, and not for limitation purposes, the coexistence element 200 is described with simultaneous reference to the PON 100.

As depicted in FIG. 2, the coexistence element 200 can be physically disposed in between the OLTs 102*a*-102*f* and the FDH 116. The coexistence element 200 and/or the FDH 116 may optically connect the OLTs 102*a*-102*f* with the LMTUs 106*a*-106*c*. The coexistence element 200 may include input communication ports 202-210 for receiving optical communications for different optical services. For example, each input communication port 202-210 may correspond to a different optical service.

The input communication ports 202-210 for the coexistence element 200 are illustrated in FIG. 2 as downstream input communication ports 202-210, and the output communication port 220 for the coexistence element 200 is illustrated as a downstream output communication port 220. However, this is a simplified diagram for ease of illustration only. The coexistence element 200 may also include upstream input communication ports which connect, via optical fibers, to the FDH 116 and/or the LMTUs 106*a*-106*c*. Additionally, the coexistence element 200 may include an upstream output communication port which connects, via a single optical fiber, to, for example, to the FDH 116 and/or a splitter that transmits the upstream communications to the OLTs 102*a*-102*f*. The optical fiber connected to the upstream output communication port may be the same optical fiber connected to the downstream output communication port 220 or may be a different optical fiber.

In any event, IN1 (ref. no. 202) may correspond to a first optical service that transmits and receives optical communications at a first data rate, such as an XGS optical service having a data rate of 10 Gigabits per second (Gbps). IN2 (ref. no. 204) may correspond to a second optical service that transmits and receives optical communications at a second data rate, such as a 50 G optical service having a data rate of 50 Gbps. IN3 (ref. no. 206) may correspond to a third optical service that transmits and receives optical communications at a third data rate, such as a 25 G optical service having a data rate of 25 Gbps, and may correspond to a fourth optical service that transmits and receives optical communications at a fourth data rate, such as a very high speed (VHS) optical service. IN4 (ref. no. 208) may correspond to a fifth optical service that transmits and receives optical communications at a fifth data rate, such as a 100 G optical service having a data rate of 100 Gbps or a 400 G optical service having a data rate of 400 Gbps. IN5 (ref. no. 210) may correspond to a sixth optical service, such as an optical time domain reflectometry (OTDR) service for testing the performance of the optical fibers.

Additionally, each input communication port 202-210 may receive optical communications having a wavelength within a particular wavelength band corresponding to a particular optical service.

Figures 3A, 3B:
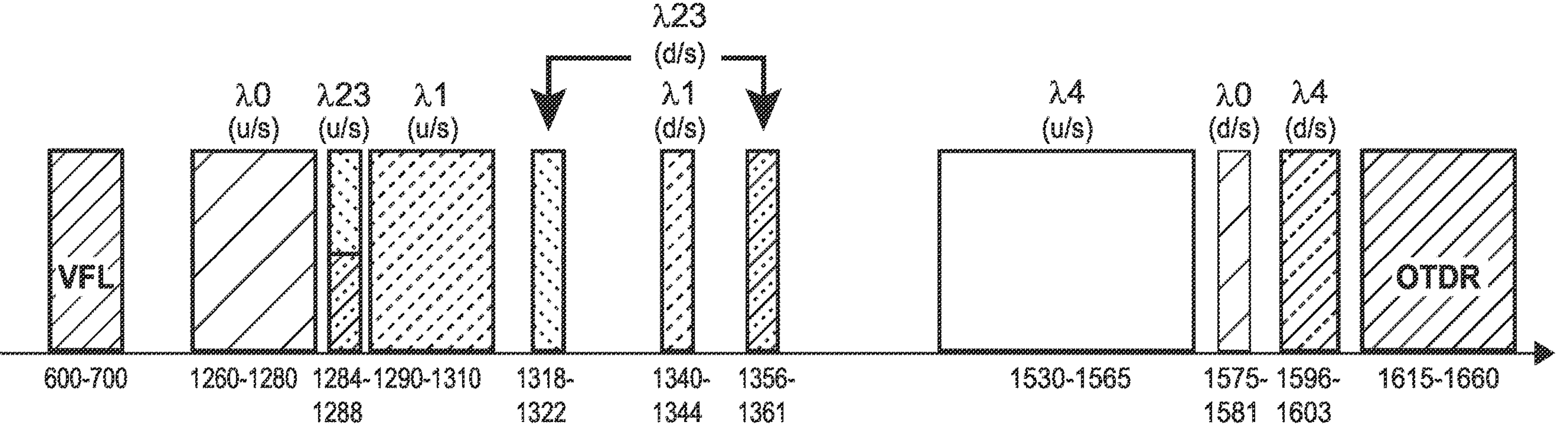
FIGS. 3A and 3B illustrate example wavelength bands or channels for each input port of the coexistence element.

The first input communication port 202 may receive optical communications for a first optical service (e.g., XGS). The first optical service for downstream communication may have a first wavelength band of about 1575 nm to 1581 nm (e.g., ±5 nm on either side of the band) and for upstream communication may have a second wavelength band of about 1260 nm to 1280 nm (e.g., ±5 nm on either side of the band). This is illustrated in FIGS. 3A and 3B, where the channel plan for the XGS optical service includes an upstream optical wavelength band of 1260 nm to 1280 nm. The XGS optical service also includes a downstream optical wavelength band of 1575 nm to 1581 nm.

The first input communication port 202 may be a downstream input communication port that receives downstream optical communications, via optical fibers, from an OLT that provides the first service 102*a*. Downstream optical communications from a first OLT 102*a* may have a first downstream wavelength ($\lambda_0$) within the first wavelength band (e.g., 1575 nm to 1581 nm).

The first input communication port 202 may also include an upstream input communication port that receives upstream communications, via optical fibers, from LMTUs that utilize the first service. Upstream optical communications from an LMTU 106*a* utilizing the first service may have an upstream wavelength within the second wavelength band (e.g., 1260 nm to 1280 nm).

The second input communication port 204 may receive optical communications for a second optical service (e.g., 50G). The second optical service for downstream communication may have a third wavelength band of about 1340 nm to 1344 nm (e.g., ±5 nm on either side of the band) and for upstream communication may have a fourth wavelength band of about 1290 nm to 1310 nm (e.g., ±5 nm on either side of the band). This is illustrated in FIGS. 3A and 3B, where the channel plan for the 50G optical service includes an upstream optical wavelength band of 1290 nm to 1310 nm. The 50G optical service also includes a downstream optical wavelength band of 1340 nm to 1344 nm.

The second input communication port 204 may be a downstream input communication port that receives downstream optical communications, via optical fibers, from an OLT that provides the second service 102*b*. Downstream optical communications from a second OLT 102*b* may have a second downstream wavelength ($\lambda_1$) within the third wavelength band (e.g., 1340 nm to 1344 nm).

The second input communication port 204 may also include an upstream input communication port that receives upstream communications, via optical fibers, from LMTUs that utilize the second service. Upstream optical communications from an LMTU utilizing the second service may have an upstream wavelength within the fourth wavelength band (e.g., 1290 nm to 1310 nm).

The third input communication port 206 may receive optical communications for a third optical service (e.g., VHS) and a fourth optical service (e.g., 25G). As shown in FIG. 2, IN3 (ref. no. 206) may receive optical communications having wavelengths within two or more different wavelength bands.

More specifically, the two or more different wavelength bands for downstream communication for IN3 (ref. no. 206) may include a fifth wavelength band of about 1318 nm to 1322 nm (e.g., ±5 nm on either side of the band) and a sixth wavelength band of about 1356 nm to 1361 nm (e.g., ±5 nm on either side of the band). The wavelength band for upstream communication for the IN3 (ref. no. 206) may include a seventh wavelength band of about 1284 nm to 1288 nm (e.g., ±5 nm on either side of the band). This is illustrated in FIGS. 3A and 3B, where the channel plan for the third (e.g., VHS) and fourth (e.g., 25G) optical services includes downstream optical wavelength bands of 1318 nm to 1322 nm and 1356 nm to 1361 nm, respectively. The third (e.g., VHS) and fourth (e.g., 25G) optical services share an upstream optical wavelength band of 1284 nm to 1288 nm.

In some implementations, the two or more wavelength bands for an input communication port may be overlapping. For example, the two or more wavelength bands may include one wavelength band of 1260 nm to 1280 nm and another wavelength band of 1280 nm to 1290 nm. In other implementations, the two or more wavelength bands may not overlap.

The third input communication port 206 may be a downstream input communication port that receives downstream optical communications, via optical fibers, from OLTs that provide the third service 102*c*. Downstream optical communications from a third OLT 102*c* may have a third downstream wavelength ($\lambda_2$) within the fifth wavelength band (e.g., 1318 nm to 1322 nm). The downstream input communication port may also receive downstream optical communications, via optical fibers, from OLTs that provide the fourth service 102*d*. Downstream optical communication from a fourth OLT 102*d* may have a fourth downstream wavelength ($\lambda_3$) within the sixth wavelength band (e.g., 1356 nm to 1361 nm).

In some implementations, the OLTs 102*c*, 102*d* may provide downstream optical communications, via optical fibers, to another coexistence element or combiner that combines the downstream optical communications having different wavelengths ($\lambda_2$ and $\lambda_3$), and transmits the combined downstream optical communication via a single optical fiber to the third input communication port 206.

The third input communication port 206 may also include an upstream input communication port that receives upstream communications, via optical fibers, from LMTUs that utilize the third service and the fourth service 106*b*, 106*c*. Upstream optical communications from a second LMTU 106*b* utilizing the third service may have a first upstream wavelength within the seventh wavelength band (e.g., 1284 nm to 1288 nm). Upstream optical communication from a third LMTU 106*c* utilizing the fourth service may have a second upstream wavelength also within the seventh wavelength band (e.g., 1284 nm to 1288 nm). Accordingly, upstream communications for multiple services may be transmitted to the third input communication port 206 over the same wavelength band.

The fourth input communication port 208 may receive optical communications for a fifth optical service (e.g., 100G or 400G). The fourth optical service for downstream communication may have an eighth wavelength band of about 1596 nm to 1603 nm (e.g., ±5 nm on either side of the band) and for upstream communication may have a ninth wavelength band of about 1530 nm to 1565 nm (e.g., ±5 nm on either side of the band). This is illustrated in FIGS. 3A and 3B, where the channel plan for an upgraded optical service (e.g., a 100G or 400G optical service) includes an upstream optical wavelength band of 1530 nm to 1565 nm. The upgraded optical service also includes a downstream optical wavelength band of 1596 nm to 1603 nm.

The fourth input communication port 208 may be a downstream input communication port that receives downstream optical communications, via optical fibers, from an OLT that provides the fifth service 102*e*. Downstream optical communications from a fifth OLT 102*e* may have a fifth downstream wavelength ($\lambda_4$) within the eighth wavelength band (e.g., 1596 nm to 1603 nm).

The fourth input communication port 208 may also include an upstream input communication port that receives upstream communications, via optical fibers, from LMTUs that utilize the fifth service. Upstream optical communications from an LMTU utilizing the fifth service may have an upstream wavelength within the ninth wavelength band (e.g., 1530 nm to 1565 nm).

The fifth input communication port 210 may receive optical communications for a sixth optical service (e.g., OTDR). The sixth optical service for downstream communication may have a tenth wavelength band of about 600 nm to 700 nm (e.g., ±5 nm on either side of the band) and for upstream communication may have an eleventh wavelength band of about 1615 nm to 1660 nm (e.g., ±5 nm on either side of the band). This is illustrated in FIGS. 3A and 3B, where the channel plan for the OTDR optical service includes an upstream optical wavelength band of 1615 nm to 1660 nm. The OTDR optical service also includes a downstream optical wavelength band of 600 nm to 700 nm.

The fifth input communication port 210 may be a downstream input communication port that receives light having a sixth downstream wavelength ($\lambda_5$) within the tenth wavelength band (e.g., 600 nm to 700 nm) from an OTDR service 102*f* connected to the fifth input communication port 210 via an optical fiber. The OTDR service 102 may include a light source which injects light across the optical fiber to the fifth input communication port 210. The light may then be transmitted from an output communication port 220 via another optical fiber 230 connected to the output communication port 220 to test the performance of the optical fiber 230 or to test the performance of another optical fiber.

For example, the OTDR service 102*f* may measure reflections off the glass of the optical fiber 230 to identify breaks in the glass. The sixth downstream wavelength ($\lambda_5$) may be within the visible light spectrum which may allow an operator to view the light being transmitted across the optical fiber 230 during testing. The OTDR service 102*f* may include an optical detector to detect light reflected off the glass. The OTDR service 102*f* may analyze the intensity or power of the reflected light at the optical detector to measure the attenuation of the signal across the optical fiber 230. The OTDR service 102*f* may also determine the location within the optical fiber 230 where the signal is attenuated based on the time of flight of the reflected light.

The time of flight of the reflected light may be the time from when the light is transmitted until the reflected light is received at the optical detector. For example, the distance (D) between the transmitted light from one end of the optical fiber to the point on the optical fiber where the light was reflected may be proportional to the speed of light (c) and half of the time of flight (t) of the reflected light ($D=c*t/2$). The OTDR service 102*f* may then identify the location of the point on the optical fiber where light was reflected based on the distance from one end of the optical fiber.

The fifth input communication port 210 may also include an upstream input communication port that receives light having an upstream wavelength within the eleventh wavelength band (e.g., 1615 nm to 1660 nm) from an OTDR service connected to the upstream input communication port 210 via an optical fiber. The OTDR service may include a light source which injects light across the optical fiber to the upstream input communication port 210. The light may then be transmitted from an upstream output communication port via another optical fiber connected to the upstream output communication port to test the performance of the optical fiber or to test the performance of another optical fiber.

In some implementations, each input communication port may include an optical filter that receives light within the wavelength band(s) for the input communication port and reflects light outside of the wavelength band(s) for the input communication port. For example, the second input communication port may receive light for downstream communications within the sixth wavelength band and may reflect light for downstream communications having wavelengths outside of the sixth wavelength band.

The coexistence element 200 may receive the optical communications from each of the input communication ports 202-210 and combine the optical communications having multiple wavelengths ($\lambda_0$-$\lambda_5$) into a combined optical communication. For example, the coexistence element 200 may be a combiner or wavelength division multiplexer (WDM) that uses coarse wave-division multiplexing (CWDM) or dense wave-division multiplexing (DWDM).

The output communication port 220 of the coexistence element 200 then transmits, to the FDH 116 and/or the LMTUs 106*a*-106*c*, the combined optical communication ($\lambda_0$-$\lambda_5$) across a single optical fiber 230 connected to the output communication port 220. The splitter 114 at the FDH 116 or a demultiplexer then demultiplexes the combined optical communication into each of separate optical communications having different wavelengths ($\lambda_0, \lambda_1, \ldots \lambda_5$). Then the FDH 116 transmits the separate optical communications for different services to respective LMTUs 106*a*-106*c*.

While six OLTs and three LMTUs are illustrated in FIG. 2, this is merely one example for ease of illustration only. Any suitable number of OLTs and any suitable number of LMTUs may be included in the PON 100. Additionally, while five input ports are illustrated in the coexistence element 200 in FIG. 2, this is merely one example for ease of illustration only. Any suitable number of input ports may be included in the coexistence element 200.

Furthermore, while the third input communication port 206 is shown in FIG. 2 as receiving optical communications having wavelengths within two or more different wavelength bands, this is merely on example for ease of illustration only. Any suitable input communication port 206 corresponding to any suitable optical service may receive optical communications having wavelengths for upstream or downstream communication within two or more different wavelength bands, and the optical communications may be for any suitable number of optical services.

Moreover, while the five input ports are referred to as corresponding to six optical services, this is merely one example for ease of illustration only. Any suitable number of input ports may correspond to any suitable number of optical services in the coexistence element 200. The optical services described herein are merely example services for ease of illustration only. The coexistence element 200 and each of the input ports 202-210 may receive optical communications provided by any suitable optical services.

Example Method at a Coexistence Element

Figure 4:
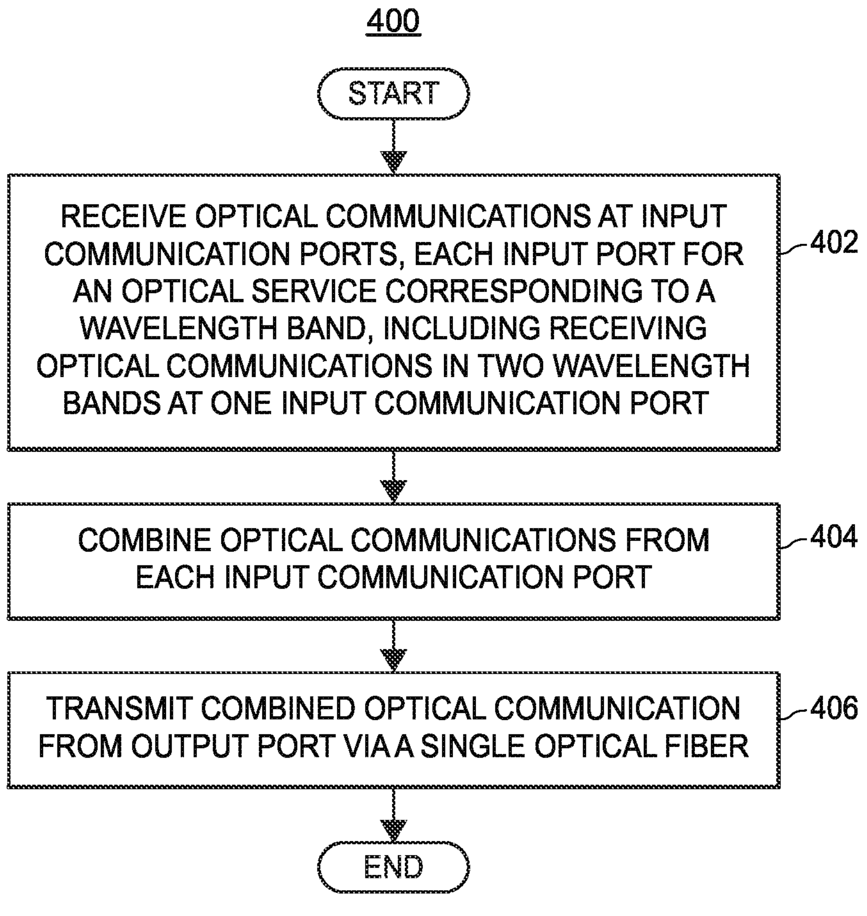
FIG. 4 depicts a flow diagram of an example method for wavelength division multiplexing at a coexistence element utilized in a passive optical network.

FIG. 4 depicts a flow diagram of an example method 400 at a coexistence element utilized in a passive optical network. For example, instances of the method 400 may be executed at the coexistence element 200 of FIG. 2. For ease of illustration, and not for limitation purposes, the method 400 is described with simultaneous reference to the PON 100 of FIG. 1 and the example coexistence element 200 depicted in FIG. 2.

At block 402, the input communication ports 202-210 within the coexistence element 200 receive optical communications via separate optical fibers, for example from OLTs 102*a*-102*f* or LMTUs 106*a*-106*c*. For example, the input communication ports 202-210 may be downstream input communication ports 202-210 that receive downstream optical communications from the OLTs 102*a*-102*f*. Additionally, the input communication ports 202-210 may be upstream input communication ports 202-210 that receive upstream optical communications from the LMTUs 106*a*-106*f*. The input communication ports 202-210 may be any suitable combination of downstream input communication ports 202-210 and/or upstream input communication ports 202-210.

In any event, the optical communications each have a wavelength (e.g., $\lambda_0$) within a particular wavelength band (1575 nm to 1581 nm) corresponding to a particular optical service (e.g., XGS). Each input communication port 202-210 may correspond to a different optical service. In some implementations, an input communication port 202-210 may correspond to multiple optical services (e.g., VHS and 25G). Additionally, at least one of the input communication ports 202-210 may receive optical communications having wavelengths within two or more wavelength bands. For example, the optical communications received at an input port may correspond to different services. Furthermore, at least one of the input communication ports 202-210 may receive optical communications having wavelengths within the same wavelength band which correspond to different optical services.

At block 404, the coexistence element 200 combines the optical communications from each input communication port 202-210 into a combined optical communication. The combined optical communication includes a combination of optical communications having multiple wavelengths ($\lambda_0$-$\lambda_5$).

Then at block 406, the output communication port 220 within the coexistence element 200 transmits the combined optical communication via a single optical fiber 230. The output communication port 220 may be a downstream output communication port 220 that transmits a downstream combined optical communication via the single optical fiber 230 to the FDH 116 and/or the LMTUs 106*a*-106*c*. Additionally, the output communication port 220 may be an upstream output communication port 220 that transmits an upstream combined optical communication via the single optical fiber 230 to the FDH 116 and/or the OLTs 102*a*-102*f*. The output communication port 220 may be any suitable combination of a downstream output communication port 220 and/or an upstream output communication port 220.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A coexistence element within a passive optical network (PON) comprising: a housing including: a plurality of input communication ports each configured to receive, via a separate optical fiber, optical communications each having a wavelength within a particular wavelength band corresponding to a particular optical service, wherein at least one of the plurality of input communication ports is configured to receive optical communications having wavelengths within two or more different wavelength bands; and an output communication port configured to transmit, via a single optical fiber, the optical communications from each of the plurality of input communication ports.

2. The coexistence element of example 1, wherein the plurality of input communication ports are downstream input communication ports each configured to receive the optical communications from one or more optical line terminals (OLTs) and the output communication port is a downstream output communication port configured to transmit the optical communications to one or more last mile termination units (LMTUs).

3. The coexistence element of example 1, wherein the plurality of input communication ports are upstream input communication ports each configured to receive the optical communications from one or more LMTUs and the output communication port is an upstream output communication port configured to transmit the optical communications to one or more OLTs.

4. The coexistence element of example 1, wherein the plurality of input communication ports includes a first input communication port and the particular optical service for the first input communication port is a first optical service that transmits and receives the optical communications at a first data rate.

5. The coexistence element of example 6, wherein the first input communication port for downstream communication includes a first wavelength band of about 1575 nm to 1581 nm, and wherein the first input communication port for upstream communication includes a second wavelength band of about 1260 nm to 1280 nm.

6. The coexistence element of example 1, wherein the plurality of input communication ports includes a second input communication port and the particular optical service for the second input communication port is a second optical service that transmits and receives the optical communications at a second data rate 7. The coexistence element of example 6, wherein the second input communication port for downstream communication includes a third wavelength band of about 1340 nm to 1344 nm, and wherein the second input communication port for upstream communication includes a fourth wavelength band of about 1290 nm to 1310 nm.

8. The coexistence element of example 1, wherein the two or more different wavelength bands for the same input communication port for downstream communication include a fifth wavelength band of about 1318 nm to 1322 nm and a sixth wavelength band of about 1356 nm to 1361 nm.

9. The coexistence element of example 8, wherein the at least one input communication port is a third input communication port and the particular optical service for the first input communication port includes a third optical service that transmits and receives the optical communications at a third data rate and a fourth optical service that transmits and receives the optical communication at a fourth data rate, and wherein the third input communication port for upstream communication includes a seventh wavelength band of about 1284 nm to 1288 n.

10. The coexistence element of example 1, wherein the plurality of input communication ports includes a fourth input communication port and the particular optical service for the fourth input communication port is a fifth optical service that transmits and receives the optical communications at a fifth data rate.

11. The coexistence element of example 10, wherein the fourth input communication port for downstream communication includes an eighth wavelength band of about 1596 nm to 1603 nm, and wherein the fourth input communication port for upstream communication includes a ninth wavelength band of about 1530 nm to 1565 nm.

12. The coexistence element of example 1, wherein the plurality of input communication ports includes an optical time domain reflectometry (OTDR) port configured to test performance of at least one of the optical fibers coupled to the coexistence element.

13. The coexistence element of example 12, wherein a light source is optically coupled to the OTDR port for injecting light across the at least one optical fiber to perform the test.

14. The coexistence element of example 12, wherein the OTDR port for downstream communication includes a tenth wavelength band of about 600 nm to 700 nm, and wherein the OTDR communication port for upstream communication includes an eleventh wavelength band of about 1615 nm to 1660 nm.

15. A method for wavelength division multiplexing, comprising: receiving, at each of a plurality of input communication ports within a coexistence element in a passive optical network (PON) via a separate optical fiber, optical communications each having a wavelength within a particular wavelength band corresponding to a particular optical service, wherein at least one of the plurality of input communication ports receives optical communications having wavelengths within two or more different wavelength bands; combining, by the coexistence element, the plurality of optical communications; and transmitting, by an output communication port within the coexistence element, the combined optical communication via a single optical fiber.

16. The method of example 15, wherein the plurality of input communication ports are downstream input communication ports each configured to receive the optical communications from one or more optical line terminals (OLTs) and the output communication port is a downstream output communication port configured to transmit the optical communications to one or more last mile termination units (LMTUs).

17. The method of example 15, wherein the plurality of input communication ports are upstream input communication ports each configured to receive the optical communications from one or more LMTUs and the output communication port is an upstream output communication port configured to transmit the optical communications to one or more OLTs.

18. The method of example 15, wherein the plurality of input communication ports includes a first input communication port and the particular optical service for the first input communication port is a first optical service that transmits and receives the optical communications at a first data rate.

19. The method of example 18, wherein the first input communication port for downstream communication includes a first wavelength band of about 1575 nm to 1581 nm, and wherein the first input communication port for upstream communication includes a second wavelength band of about 1260 nm to 1280 nm.

20. The method of example 15, wherein the plurality of input communication ports includes a second input communication port and the particular optical service for the second input communication port is a second optical service that transmits and receives the optical communications at a second data rate.

21. The method of example 20, wherein the second input communication port for downstream communication includes a third wavelength band of about 1340 nm to 1344 nm, and wherein the second input communication port for upstream communication includes a fourth wavelength band of about 1290 nm to 1310 nm.

22. The method of example 15, wherein the two or more different wavelength bands for the same input communication port for downstream communication include a fifth wavelength band of about 1318 nm to 1322 nm and a sixth wavelength band of about 1356 nm to 1361 nm.

23. The method of example 22, wherein the at least one input communication port is a third input communication port and the particular optical service for the third input communication port includes a third optical service that transmits and receives the optical communications at a third data rate and a fourth optical service that transmits and receives the optical communication at a fourth data rate, and wherein the third input communication port for upstream communication includes a seventh wavelength band of about 1284 nm to 1288 nm.

24. The method of example 15, wherein the plurality of input communication ports includes a fourth input communication port and the particular optical service for the fourth input communication port is a fifth optical service that transmits and receives the optical communications at a fifth data rate.

25. The method of example 24, wherein the fourth input communication port for downstream communication includes an eighth wavelength band of about 1596 nm to 1603 nm, and wherein the fourth input communication port for upstream communication includes a ninth wavelength band of about 1530 nm to 1565 nm.

26. The method of example 15, wherein the plurality of input communication ports includes an optical time domain reflectometry (OTDR) port, and further comprising: testing a performance of at least one of the optical fibers coupled to the coexistence element by injecting light, via the OTDR port, across the at least one optical fiber.

27. The method of example 26, wherein the OTDR port for downstream communication includes a tenth wavelength band of about 600 nm to 700 nm, and wherein the OTDR communication port for upstream communication includes an eleventh wavelength band of about 1615 nm to 1660 nm.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as “means for” or “step for” language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A coexistence element within a passive optical network (PON) comprising:

a housing including:

a plurality of input communication ports each configured to receive, via a separate optical fiber, optical communications each having a wavelength within a particular wavelength band corresponding to a particular optical service including a first input communication port, wherein the particular optical service for the first input communication port is a first optical service that transmits and receives the optical communications at a first data rate, and wherein at least one of the plurality of input communication ports is configured to receive optical communications having wavelengths within two or more different wavelength bands; and an output communication port configured to transmit, via a single optical fiber, the optical communications from each of the plurality of input communication ports.

2. The coexistence element of claim 1, wherein the plurality of input communication ports are downstream input communication ports each configured to receive the optical communications from one or more optical line terminals (OLTs) and the output communication port is a downstream output communication port configured to transmit the optical communications to one or more last mile termination units (LMTUs).

3. The coexistence element of claim 1, wherein the plurality of input communication ports are upstream input communication ports each configured to receive the optical communications from one or more LMTUs and the output communication port is an upstream output communication port configured to transmit the optical communications to one or more OLTs.

4. The coexistence element of claim 1, wherein the first input communication port for downstream communication includes a first wavelength band of about 1575 nm to 1581 nm, and wherein the first input communication port for upstream communication includes a second wavelength band of about 1260 nm to 1280 nm.

5. The coexistence element of claim 1, wherein the plurality of input communication ports includes a second input communication port and the particular optical service for the second input communication port is a second optical service that transmits and receives the optical communications at a second data rate.

6. The coexistence element of claim 5, wherein the second input communication port for downstream communication includes a third wavelength band of about 1340 nm to 1344 nm, and wherein the second input communication port for upstream communication includes a fourth wavelength band of about 1290 nm to 1310 nm.

7. The coexistence element of claim 1, wherein the two or more different wavelength bands for the same input communication port for downstream communication include a fifth wavelength band of about 1318 nm to 1322 nm and a sixth wavelength band of about 1356 nm to 1361 nm.

8. The coexistence element of claim 7, wherein the at least one input communication port is a third input communication port and the particular optical service for the first input communication port includes a third optical service that transmits and receives the optical communications at a third data rate and a fourth optical service that transmits and receives the optical communication at a fourth data rate, and wherein the third input communication port for upstream communication includes a seventh wavelength band of about 1284 nm to 1288 nm.

9. The coexistence element of claim 1, wherein the plurality of input communication ports includes a fourth input communication port and the particular optical service for the fourth input communication port is a fifth optical service that transmits and receives the optical communications at a fifth data rate.

10. The coexistence element of claim 9, wherein the fourth input communication port for downstream communication includes an eighth wavelength band of about 1596 nm to 1603 nm, and wherein the fourth input communication port for upstream communication includes a ninth wavelength band of about 1530 nm to 1565 nm.

11. The coexistence element of claim 1, wherein the plurality of input communication ports includes an optical time domain reflectometry (OTDR) port configured to test performance of at least one of the optical fibers coupled to the coexistence element.

12. The coexistence element of claim 11, wherein a light source is optically coupled to the OTDR port for injecting light across the at least one optical fiber to perform the test.

13. The coexistence element of claim 11, wherein the OTDR port for downstream communication includes a tenth wavelength band of about 600 nm to 700 nm, and wherein the OTDR communication port for upstream communication includes an eleventh wavelength band of about 1615 nm to 1660 nm.

14. A method for wavelength division multiplexing, comprising:

receiving, at each of a plurality of input communication ports within a coexistence element in a passive optical network (PON) via a separate optical fiber, optical communications each having a wavelength within a particular wavelength band corresponding to a particular optical service including a first input communication port, wherein the particular optical service for the first input communication port is a first optical service that transmits and receives the optical communications at a first data rate, and wherein at least one of the plurality of input communication ports receives optical communications having wavelengths within two or more different wavelength bands;

combining, by the coexistence element, the plurality of optical communications; and transmitting, by an output communication port within the coexistence element, the combined optical communication via a single optical fiber.

15. The method of claim 14, wherein the plurality of input communication ports are downstream input communication ports each configured to receive the optical communications from one or more optical line terminals (OLTs) and the output communication port is a downstream output communication port configured to transmit the optical communications to one or more last mile termination units (LMTUs).

16. The method of claim 14, wherein the plurality of input communication ports are upstream input communication ports each configured to receive the optical communications from one or more LMTUs and the output communication port is an upstream output communication port configured to transmit the optical communications to one or more OLTs.

17. The method of claim 14, wherein the first input communication port for downstream communication includes a first wavelength band of about 1575 nm to 1581 nm, and wherein the first input communication port for upstream communication includes a second wavelength band of about 1260 nm to 1280 nm.

18. The method of claim 14, wherein the plurality of input communication ports includes a second input communication port and the particular optical service for the second input communication port is a second optical service that transmits and receives the optical communications at a second data rate.

19. The method of claim 18, wherein the second input communication port for downstream communication includes a third wavelength band of about 1340 nm to 1344 nm, and wherein the second input communication port for upstream communication includes a fourth wavelength band of about 1290 nm to 1310 nm.

20. The method of claim 14, wherein the two or more different wavelength bands for the same input communication port for downstream communication include a fifth wavelength band of about 1318 nm to 1322 nm and a sixth wavelength band of about 1356 nm to 1361 nm.

21. The method of claim 20, wherein the at least one input communication port is a third input communication port and the particular optical service for the third input communication port includes a third optical service that transmits and receives the optical communications at a third data rate and a fourth optical service that transmits and receives the optical communication at a fourth data rate, and wherein the third input communication port for upstream communication includes a seventh wavelength band of about 1284 nm to 1288 nm.

22. The method of claim 14, wherein the plurality of input communication ports includes a fourth input communication port and the particular optical service for the fourth input communication port is a fifth optical service that transmits and receives the optical communications at a fifth data rate.

23. The method of claim 22, wherein the fourth input communication port for downstream communication includes an eighth wavelength band of about 1596 nm to 1603 nm, and wherein the fourth input communication port for upstream communication includes a ninth wavelength band of about 1530 nm to 1565 nm.

24. The method of claim 14, wherein the plurality of input communication ports includes an optical time domain reflectometry (OTDR) port, and further comprising:

testing a performance of at least one of the optical fibers coupled to the coexistence element by injecting light, via the OTDR port, across the at least one optical fiber.

25. The method of claim 24, wherein the OTDR port for downstream communication includes a tenth wavelength band of about 600 nm to 700 nm, and wherein the OTDR communication port for upstream communication includes an eleventh wavelength band of about 1615 nm to 1660 nm.

* * * * *